US008217787B2

(12) United States Patent  
Miller, IV

(10) Patent No.: US 8,217,787 B2  
(45) Date of Patent: Jul. 10, 2012

(54) METHOD AND APPARATUS FOR MULTITOUCH TEXT INPUT

(75) Inventor: Thomas Marshall Miller, IV, Los Angeles, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 406 days.

(21) Appl. No.: 12/502,655

(22) Filed: Jul. 14, 2009

(65) Prior Publication Data

US 2011/0012716 A1 Jan. 20, 2011

(51) Int. Cl.
G08B 21/00 (2006.01)
(52) U.S. Cl. ........... 340/540; 340/407.1; 340/407.2; 345/173; 463/30
(58) Field of Classification Search ........... 340/540, 340/407.1, 407.2, 815.4; 345/173; 463/37, 463/43, 46, 30
See application file for complete search history.

(56) References Cited

U.S. PATENT DOCUMENTS

| 4,787,051 | A | 11/1988 | Olson |
| 4,843,568 | A | 6/1989 | Krueger et al. |
| 5,128,671 | A | 7/1992 | Thomas, Jr. |
| 5,412,189 | A * | 5/1995 | Cragun ............... 235/379 |
| 5,528,265 | A | 6/1996 | Harrison |
| 6,157,368 | A | 12/2000 | Fager |
| 6,375,572 | B1 | 4/2002 | Masuyama et al. |
| 6,597,345 | B2 * | 7/2003 | Hirshberg ............ 345/168 |
| 7,190,351 | B1 * | 3/2007 | Goren ............... 345/173 |
| 7,479,949 | B2 * | 1/2009 | Jobs et al. ........... 345/173 |
| 7,653,883 | B2 * | 1/2010 | Hotelling et al. ........ 715/863 |
| 7,940,250 | B2 * | 5/2011 | Forstall ............ 345/173 |
| 2002/0085097 | A1 | 7/2002 | Colmenarez et al. |
| 2003/0095095 | A1 | 5/2003 | Pihlaja |
| 2004/0212589 | A1 | 10/2004 | Hall et al. |
| 2006/0197752 | A1 | 9/2006 | Hurst et al. |
| 2006/0228147 | A1 | 10/2006 | Takada et al. |
| 2008/0111798 | A1 | 5/2008 | Oveisi |
| 2009/0124337 | A1 | 5/2009 | Lyons et al. |
| 2009/0128506 | A1 * | 5/2009 | Nurmi ............... 345/173 |
| 2009/0143141 | A1 | 6/2009 | Wells et al. |
| 2010/0156656 | A1 * | 6/2010 | Duarte et al. ........ 340/815.4 |

OTHER PUBLICATIONS

Bolt, R.A., "Put-that-there: voice and gesture at the graphics interface", Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

PCT Notification of Transmittal of the International Search Report and the Written Opinion of the International Searching Authority, or the Declaration for PCT/US 10/41354, mailed Aug. 30, 2010, 8 pages.

PCT Notification of Transmittal of the International Search Report and the Written Opinion of the International Searching Authority, or the Declaration for PCT/US 10/41351, Sep. 1, 2010, 8 pages.

* cited by examiner

Primary Examiner — Toan N Pham
(74) Attorney, Agent, or Firm — Lerner, David, Littenberg, Krumholz & Mentlik, LLP

(57) ABSTRACT

Text input may be entered on an electronic text input device by a user simultaneously contacting at least two of a plurality of discrete touch sensitive areas on a first surface of the device. A text character for input is determined, based on the touch sensitive areas which are detected as being simultaneously in contact with the user. The determined text character is locked by subsequent user action. A second surface of the device, such as that opposite the first surface, may include a display on which the determined text character and other information may be displayed.

24 Claims, 18 Drawing Sheets

A

B

C

D

E

F

METHOD AND APPARATUS FOR MULTITOUCH TEXT INPUT

CROSS REFERENCE TO RELATED APPLICATION

This application is related to "METHOD AND APPARATUS FOR MULTI-TOUCH GAME COMMANDS" U.S. application Ser. No. 12/502,638 filed Jul. 14, 2009, the disclosure of which is hereby incorporated herein by reference.

BACKGROUND OF THE INVENTION

Electronic text input devices, such as portable communication devices including PDAs, mobile phones, etc., may receive text input based on a user contacting the device in some manner, for example, by depressing a single key of a keyboard or touching a discrete area on a touchscreen of the device. The buttons or discrete areas may be mapped to text characters, such as alphanumeric characters, and the user may perform a sequence of individual contact actions to enter desired text content, such as a word, into the device. Some devices may also provide for simultaneous touch input, such as by simultaneously selecting a shift key and a letter on a keyboard that is displayed on a screen.

In typical portable electronic text input devices, a keyboard or touchscreen is positioned on a surface that will face the user ("front surface") when the user uses the device, and one or more other input elements, such as a text scrolling button or other depressable buttons, are positioned on a side surface or the front surface. Based on the relatively small size of the typical device, and also the location of the keyboard or touchscreen on the front surface, the user may comfortably hold the device so as to enter text, either by resting the back surface of the device on several fingers, other than the thumb, of one or both hands, or by gripping one side surface with the thumb of one hand and an opposing side surface with several fingers of the same hand.

When the device is held as described above using both hands, the user usually enters text by performing a contact action with the thumb of either hand. Alternatively, when the device is held with only one hand, the user usually enters text by performing a contact action using a single finger, such as the thumb or index finger, of the opposing hand. The relatively very small size of the keys or touch sensitive areas on the device that would be individually contacted using a single finger of a user's hand, however, limits the speed with which text can be entered by the user with a high level of accuracy.

In addition to physical and virtual keyboards, other text entry devices also exist. For example, a stenotype machine allows a user to press multiple keys to enter certain text characters, symbols or various predefined words or phrases.

BRIEF SUMMARY OF THE INVENTION

In one aspect, a method is provided that comprises detecting user contact simultaneously with at least two of a plurality of discrete of touch sensitive areas, wherein input of a text character requires simultaneous contact by a user with at least two of the touch sensitive areas. The method also includes determining a text character based on the detected simultaneous user contact with at least two touch sensitive areas, and confirming user selection of the text character based on additional user contact with a touch-sensitive area.

Another aspect relates to a system that includes a housing having a first surface and a second surface, the first and second surfaces being opposed to each other, at least two touch-sensitive regions on the second surface, and a screen on the first surface. It further includes a processor and a memory storing instructions executable by the processor. The instructions include: identifying the regions that have been simultaneously touched by a user; determining a text character associated with the combination of the regions simultaneously touched by the user and; displaying the text character on the screen.

Yet another aspect provides a system having first, second, third and fourth user-selectable regions, each region being separately selectable from the others. The system also has a screen, a processor, and a memory storing instructions executable by the processor. In this aspect, the instructions include: identifying the first, second and third regions that have been simultaneously selected by the user; determining a text character based on the combination of the identified regions; displaying the determined text character on the screen in a first area of the screen; determining whether the user has selected the fourth user-selectable region; and displaying the determined text character on the screen in a second area of the screen, different from the first area, based on the user selecting the fourth-selectable region.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION

In one aspect, the system and method provides for input of text on an electronic text input device by a user simultaneously contacting at least two of a plurality of discrete touch sensitive areas of a touch sensitive element of the device.

Figure 1:
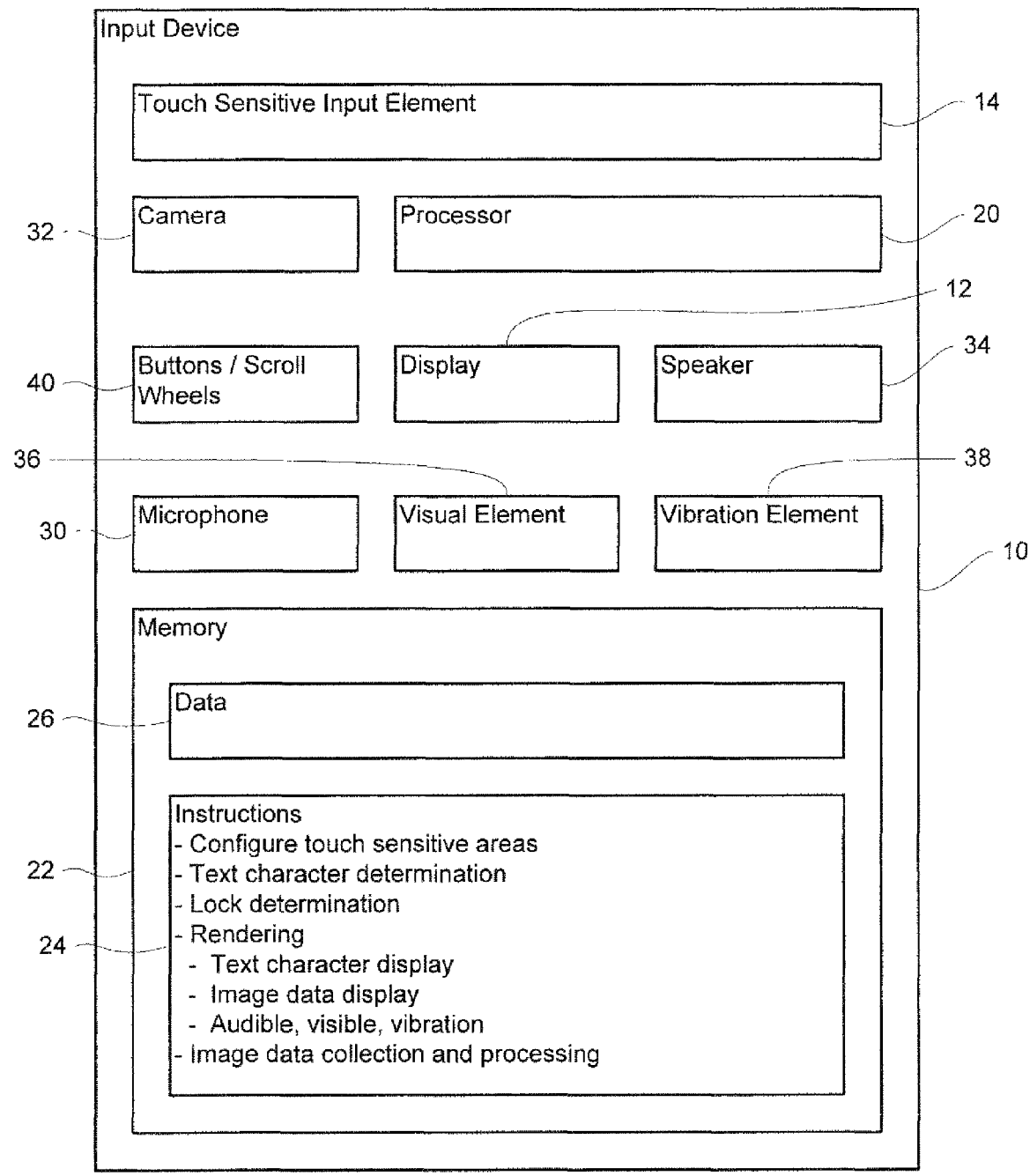
FIG. 1 is a schematic block diagram of an electronic text input device in accordance with an aspect of the invention.

As shown in FIG. 1, an electronic text input device 10 in accordance with one aspect of the invention comprises a display 12, such as an LCD screen, a touch sensitive text input element 14 and other components typically present in electronic text input devices. The device 10 is used by a user. The text input device 10, for example, may be a portable, handheld communication device, such as a PDA, mobile telephone, etc.

The input device 10 may include a processor 20 and a memory 22. The memory 22 stores information accessible by the processor 20, including instructions 24 for execution by the processor 20, and data 26 which is retrieved, manipulated or stored by the processor 20. The memory may be of any type capable of storing information accessible by the processor; by way of example, hard-drives, ROM, RAM, CD-ROM, DVD, write-capable memories, and read-only memories.

The instructions 24 may comprise any set of instructions to be executed directly (e.g., machine code) or indirectly (e.g., scripts) by the processor. The terms "instructions," "steps" and "programs" may be used interchangeably herein. The functions, methods and routines of the program in accordance with the present invention are explained in more detail below.

The data 26 may be retrieved, stored or modified by the processor 20 in accordance with the instructions 24. The data may be stored in any manner known to those of ordinary skill in the art such as in computer registers, in records contained in tables and relational databases, or in XML files. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although the processor and memory are functionally illustrated in FIG. 1 as within the same block, it will be understood by those of ordinary skill in the art that the processor and memory may actually comprise multiple processors and memories that may or may not be stored within the same physical housing. For example, some of the instructions and data may be stored on a removable DVD, CD-ROM and others within a read-only computer chip. Some or all of the instructions and data may be stored in a location physically remote from, yet still accessible by, the processor. For example, some or all of the instructions may be downloaded or accessed over a network (not shown). Similarly, the processor may actually comprise a collection of processors which may or may not operate in parallel.

All or a portion of the instructions 24 may comprise instructions for detecting and processing text input from a user, based on a user simultaneously contacting at least two discrete touch sensitive areas of a plurality of touch sensitive areas of the touch sensitive element 14, in accordance with aspects of the present invention. In one embodiment, the instructions may include touch sensitive area mapping instructions, which may configure the touch sensitive areas of the touch sensitive element, for receiving text input based on simultaneous user contact with at least two of the areas, in accordance with a text code representative of text characters, such as alphanumeric characters; touch sensitive area contact detection and processing instructions, which may determine input of a text character based on detection of a user simultaneously contacting at least two selected touch sensitive areas of the touch sensitive element; lock determination instructions, which may determine whether a lock condition for a detected text input is satisfied, such as based on detection of the user performing another contact action on the device or audible input from the user; imaging instructions, which may provide for collection and processing of data representative of images of the touch sensitive areas obtained from an imaging device that may be included with the device; and rendering instructions, which may provide for display of a determined text character or other data, such as images represented by the image data, and for generating visible, audible and vibrational output.

As noted above, the device 10 may comprise additional components typically found in an electronic text input device, such as a microphone 30, an imaging device 32 such as a camera, speakers 34, a wireless communication card, a modem (e.g., telephone or cable modem) and all of the components used for connecting these elements to one another. Accordingly, the device is desirably capable of outputting audio and video signals for rendering by displays and speakers or the like. The device 10 desirably communicates with the Internet via a modem or some other communication component such as a network card.

The device 10 may also comprise any device capable of processing instructions and transmitting data to and from humans and other computers or devices, including general purpose computers, network computers lacking local storage capability, PDAs with modems and Internet-capable wireless phones, digital video recorders, cable television set-top boxes or consumer electronic devices.

The device 10 may also include depressable buttons or scroll wheels 40, as conventional and typical in portable electronic text input devices, which a user may engage to cause one or more functionalities, which are pre-designated to such buttons or wheels, to be executed.

In addition, the device 10 may include a visual element 36, which is distinct from the display 12, such as an LED, and may be energized based on control signals supplied by the processor 20.

In addition, the device 10 may include a vibrational element 38, such as a piezoelectric device, which may be activated, based on control signals supplied by the processor 20, to cause the device to vibrate.

In one embodiment, the touch sensitive element 14 may include a conventional touchscreen panel, such as a pressure or temperature sensitive touchscreen panel, having a plurality of touch sensitive areas arranged in the form of a grid, and conventional components for detecting contact by a user with a touch sensitive area of the panel, and for generating data signals identifying a discrete touch sensitive area(s) of the panel at which contact with a user was detected. The identification may be the location of the area on the grid, such as the row and column of the grid. For example, if the touch sensitive element 14 is a touchscreen, the screen may identify the particular pixel at which the screen is touched.

Figure 2:
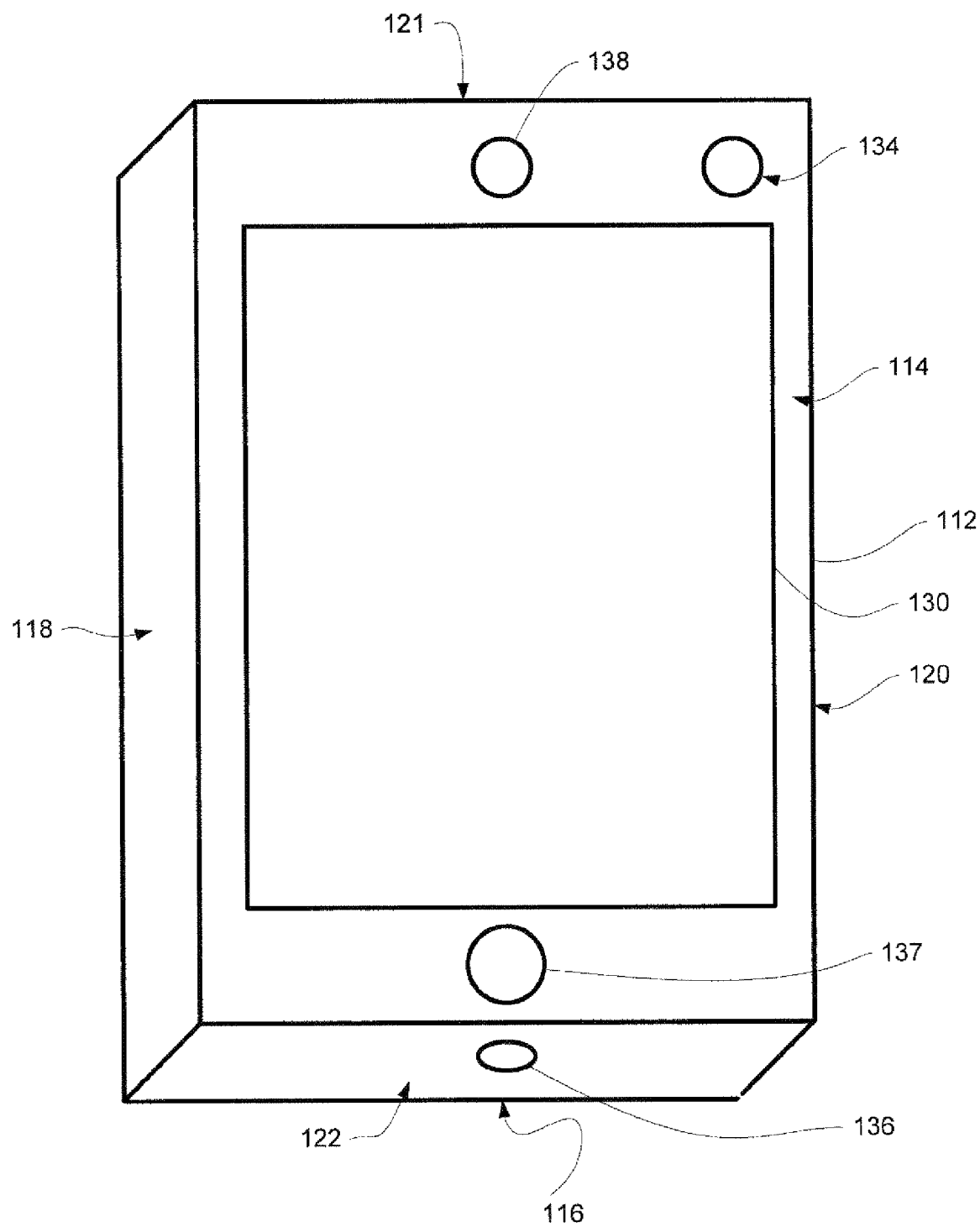
FIG. 2 is perspective view of a front surface and side surfaces of a device in accordance with an aspect of the invention.

In accordance with one embodiment of the invention, referring to FIG. 2, a portable electronic text input device 100 may include a housing 112. The components of the device 100 are contained within an interior (not shown), or are a part, of the housing 112. Referring to FIG. 2, and also to FIG. 3, the housing 112 may have two sides (such as but not limited to a box shape) such that it has a front outer surface 114, a back outer surface 116, opposing side outer surfaces 118, 120, a top outer surface 121, and a bottom outer surface 122. The front surface 114 includes a display 130, such as a touch-sensitive LCD screen. In addition, the device may include a visible light element 134, such as an LED, a microphone 136 and a depressable button 137. It may also include a speaker 138. The device may include more or less user input components as well, such as scroll wheels and more buttons.

Figure 3:
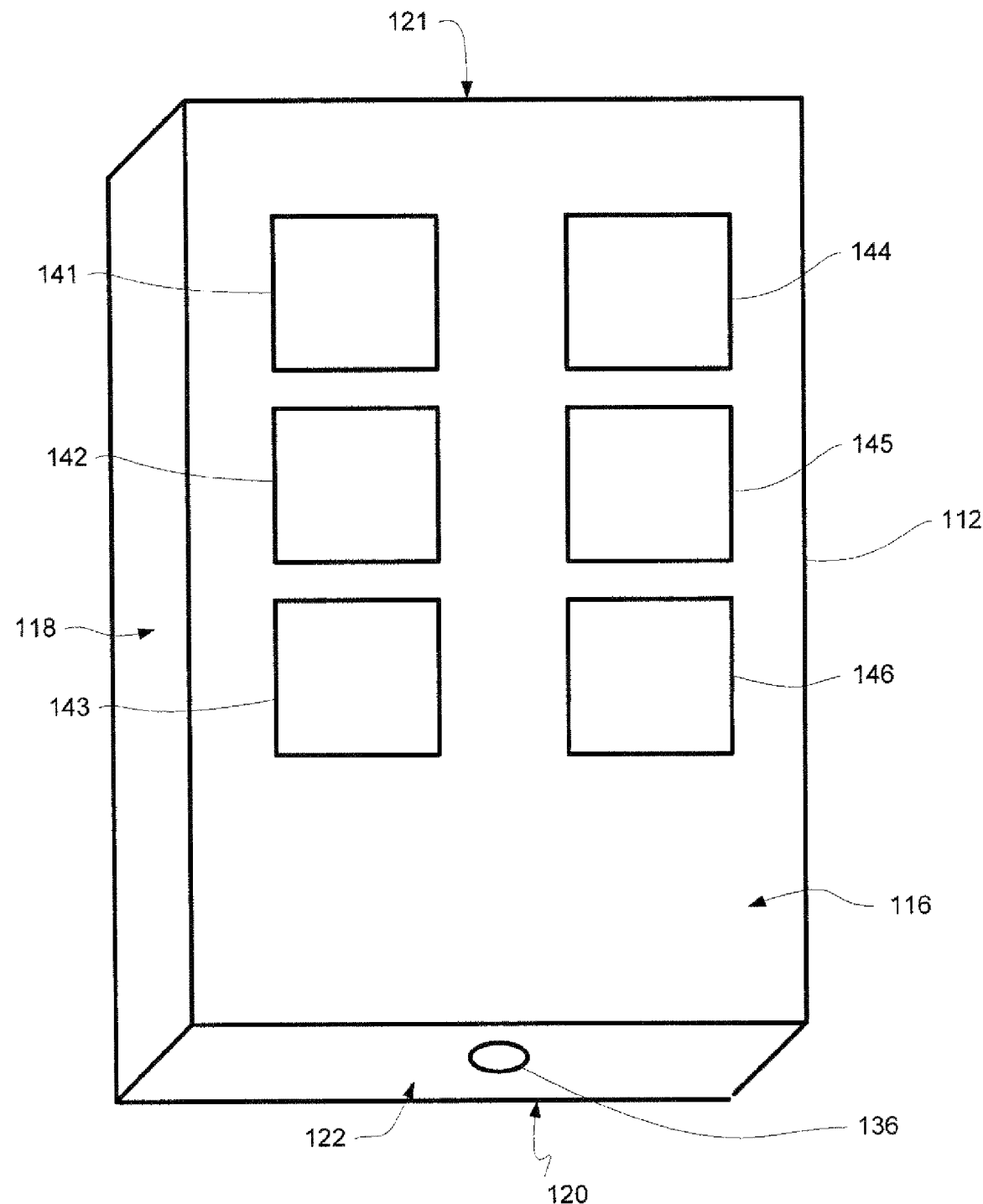
FIG. 3 is perspective view of a back surface and side surfaces of a device in accordance with an aspect of the invention.
Figure 4:
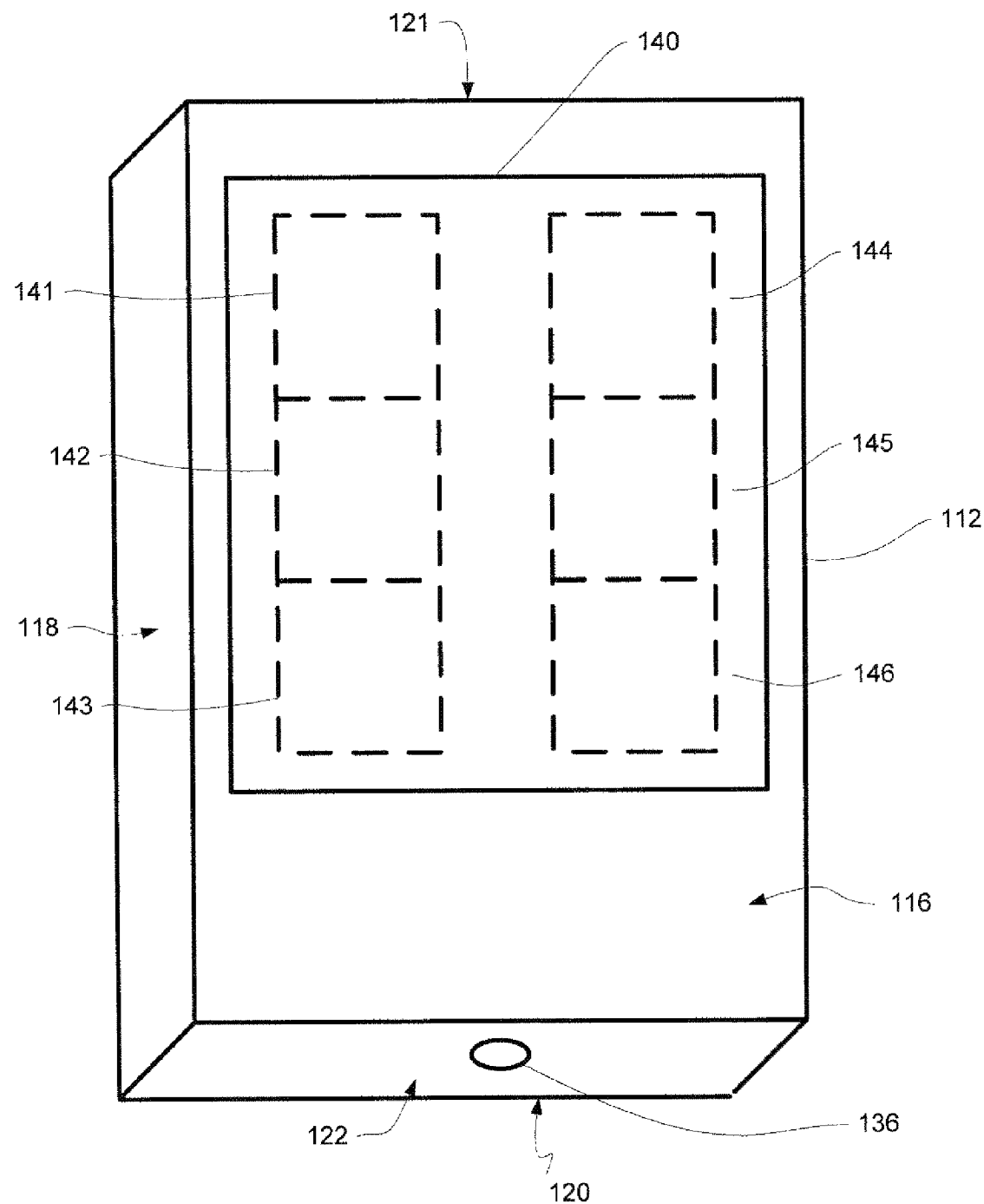
FIG. 4 is perspective view of a back surface and side surfaces of a device in accordance with an aspect of the invention.

As shown in FIG. 3, the back surface 116 may include a plurality of touch sensitive regions 141-146. For example, each region may comprise a separate button spaced apart from other buttons. Alternatively, as shown in FIG. 4, the processor may associate different regions of a single touch-sensitive component, such as a touchpad 150, with different regions 141-46. Other user-actuable elements may also be used.

The interior of the housing 112 may contain the processor 200 connected to a memory 220. The processor 200 is communicatively coupled to the display 130, the visible light element 134, the microphone 136, the button 137 and the touchpad 150.

In accordance with one aspect of the present invention, text may be entered by activating regions of the touch sensitive input element 14 whereby some text characters require two regions to be activated simultaneously. In that regard, detection of simultaneous contact by the user with at least two of the touch sensitive areas is required to register at least some text characters as text input at the device.

Figure 17:
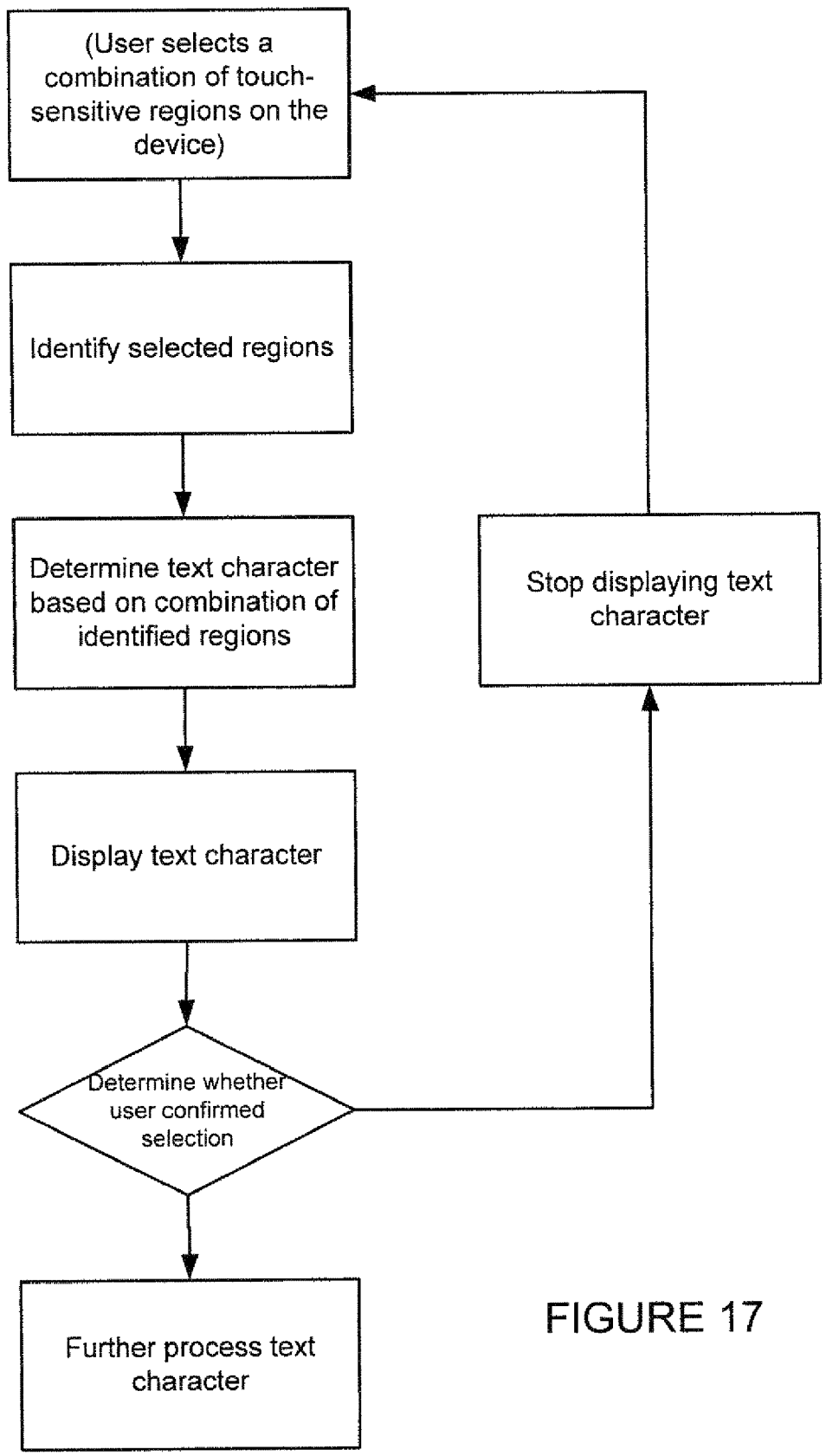
FIG. 17 is flowchart in accordance with an aspect of the invention.

In addition to the operations illustrated in FIG. 17, various operations in accordance with a variety of aspects of the invention will now be described. It should be understood that the following operations do not have to be performed in the precise order described below. Rather, various steps can be handled in reverse order or simultaneously.

Figure 5:
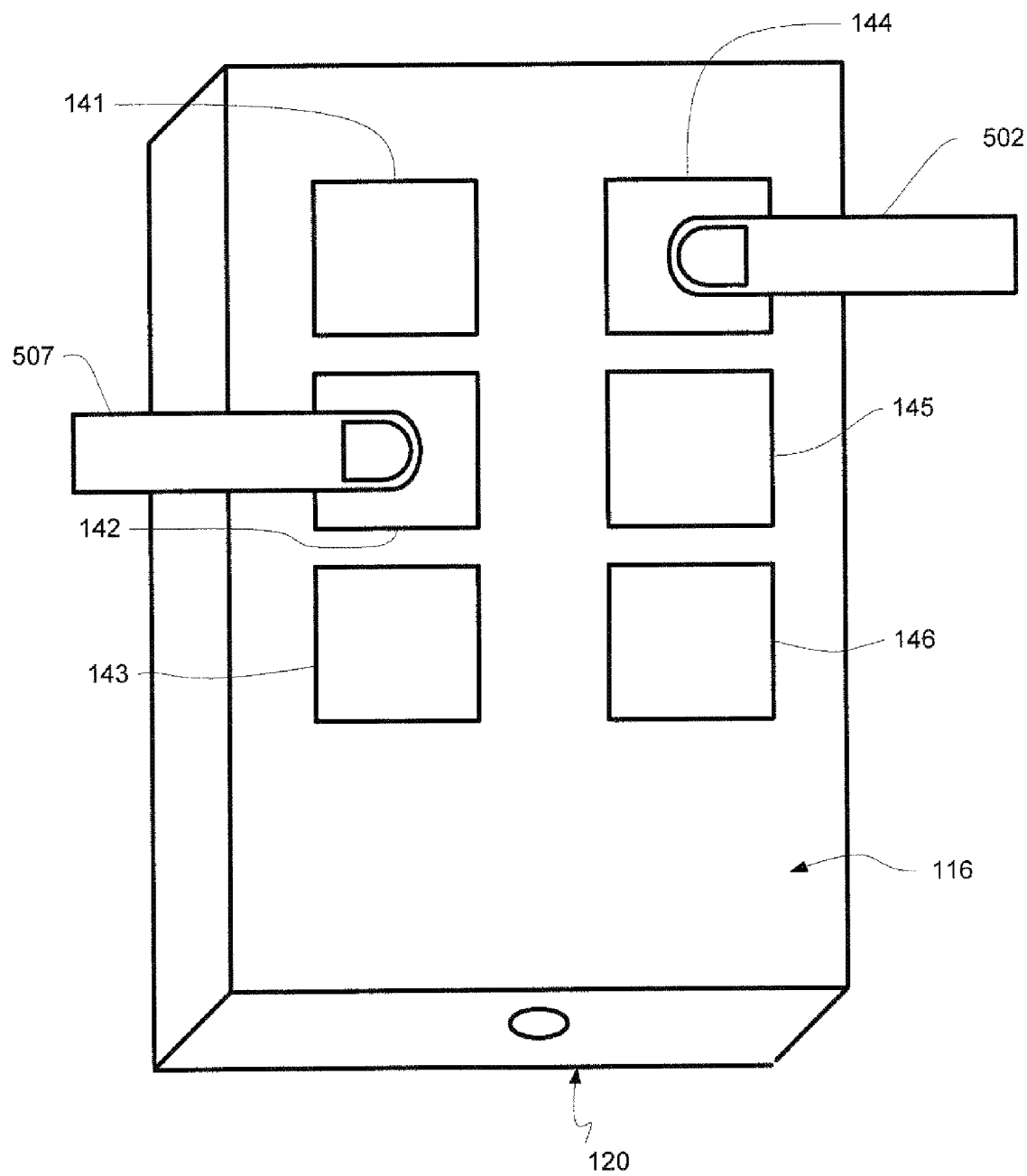
FIG. 5 is perspective view of a back surface of the device during a stage of user operation in accordance with an aspect of the invention.

In operation, the user touches one or more of the touch sensitive regions on the back of the device. As shown in FIG. 5 which is a view of the device from the back, the user may simultaneously depress regions 144 and 142 with their fingers 502 and 507, respectively.

The device then determines whether the depressed regions correspond with a character of text. For example, the processor may map different combinations of regions 141-46 to different characters.

Figure 6:
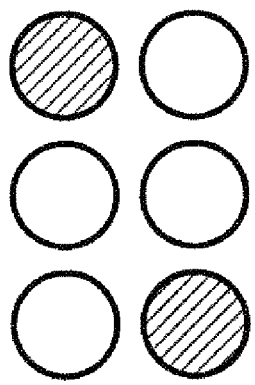
FIG. 6 is diagram of a portion of the Braille alphabet.
Figure 6:
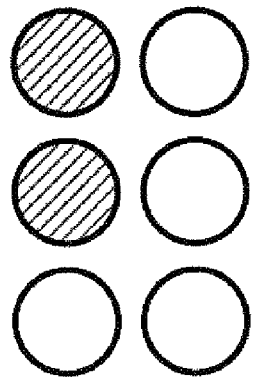
Figure 6:
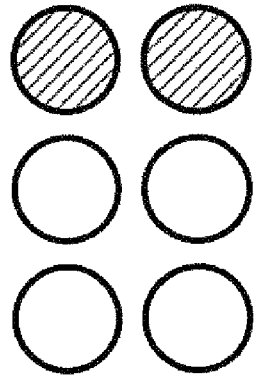
Figure 6:
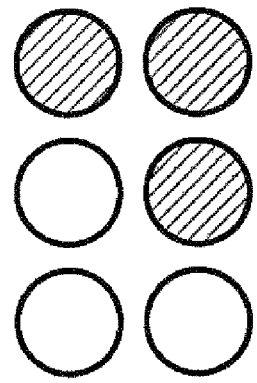
Figure 6:
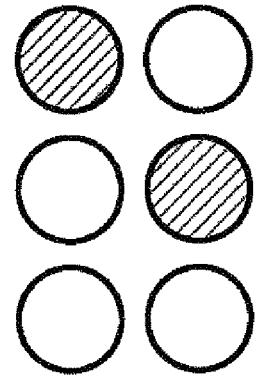
Figure 6:
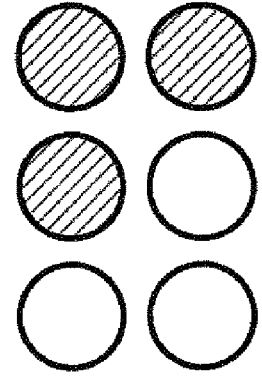

For example, the device may determine whether the depressed regions correspond with a character of the Braille alphabet. FIG. 6 illustrates a portion of the Braille alphabet. As is well known, each Braille character is made up of six dot positions arranged in a rectangle containing two columns of three dots each. A particular letter is represented by physically raising certain of the individual dots higher than the others. For example, the letter "E" is represented by raising the top-left and middle-right dots, as indicated by the cross-hatching in FIG. 6. It will be understood that while the Braille system may provide certain advantages, the system and method is not limited to such a system. Moreover, many other characters may be selected in addition to letters, such as numerals, punctuation and other symbols.

Figure 7:
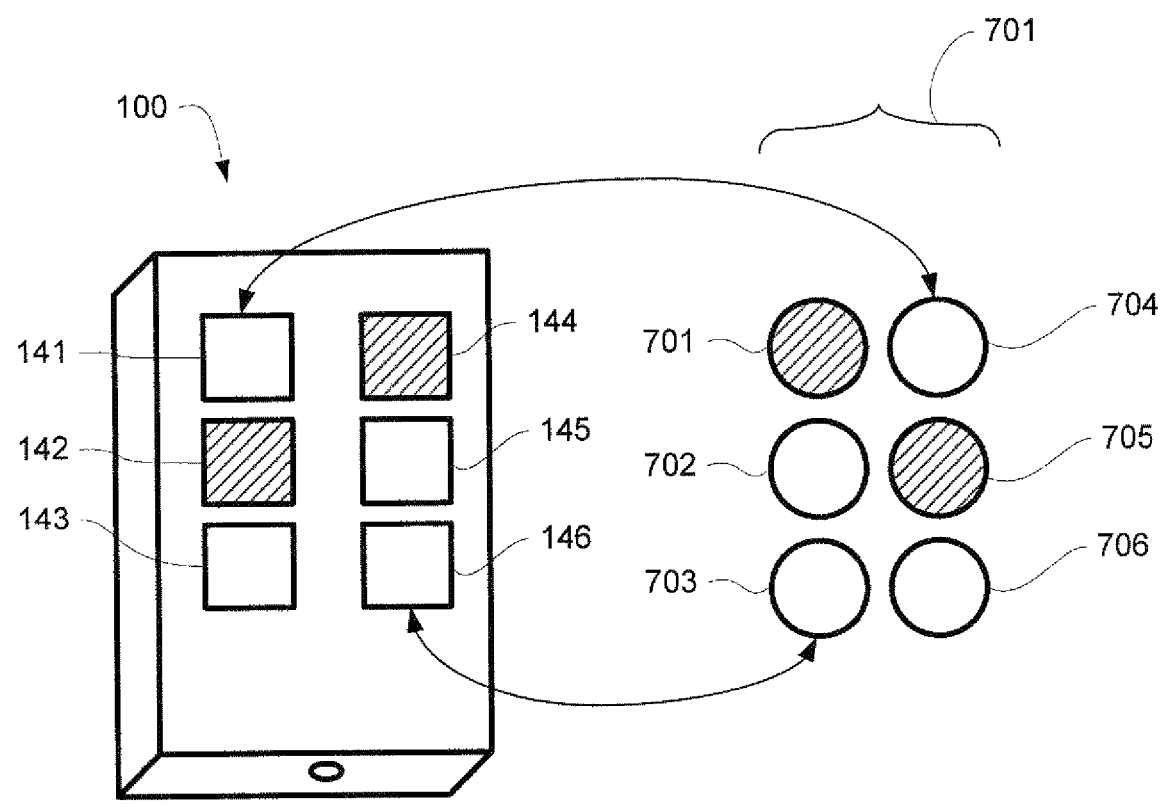
FIG. 7 is functional diagram of association between portions of a device and the Braille alphabet in accordance with an aspect of the invention.

In that regard, as shown in FIG. 7, top-left touch-sensitive region 141 of the device 100 may be associated with the top-right dot 704 of a Braille symbol 701. Similarly, bottom-right region 146 of touch-sensitive region 141 of the device 100 may be associated with the bottom-left dot 703 of a Braille symbol. The processor 200 maps each of the characters of the alphabet to different combinations of regions 140-46. For example, referring to the cross-hatching of FIG. 7, the letter "E"—which is represented by the Braille character 701—may be mapped to regions 142 and 144.

Thus, as shown in FIG. 5 which shows the back of the device, when a user uses his right middle finger 507 to touch region 142 and his left index finger 502 to touch region 144, such activation of the touch-sensitive regions may be associated with the letter "E".

Figure 8:
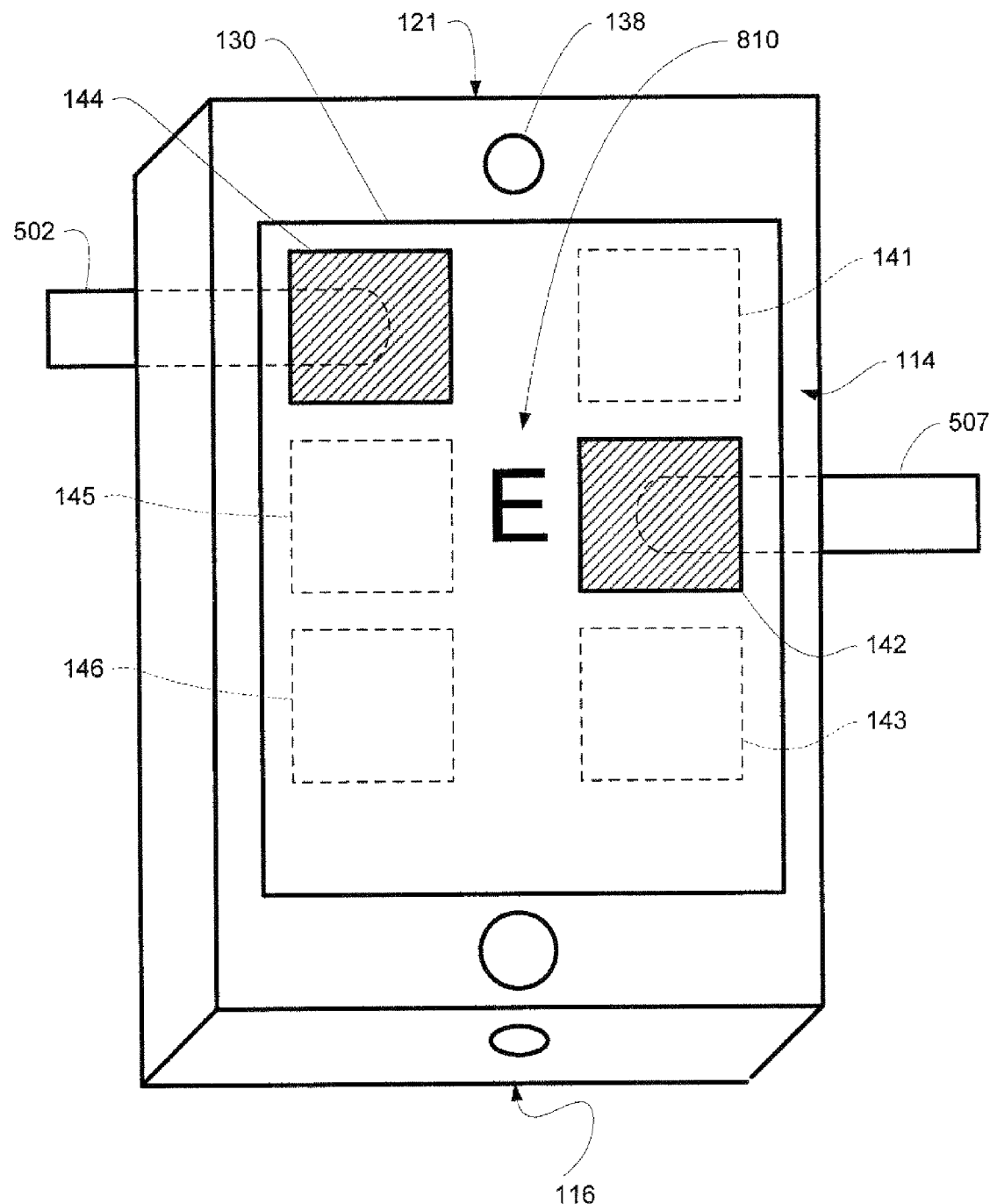
FIG. 8 is perspective view of a front surface of the device during a stage of user operation in accordance with an aspect of the invention.

FIG. 8 illustrates how the device may be operated when the user is viewing the display 130 of the device. When the user is facing the front surface 114, the touch-sensitive region 144—which is at the top-right portion of the back surface 116—will correspond with the top-left portion of the display screen 130. Similarly, touch-sensitive region 142—which is at the middle-left portion of the back surface—will correspond with the middle-right portion of the display screen 130. The relative positions of the touch-sensitive regions are indicated by references 141-46.

When the user touches the portions 142 and 144 on the back of the device (such as with left index finger 502 and right middle finger 507), the display 130 on the front of the device may provide visual or audio feedback to the user. For example, the processor may highlight the portion of the screen 130 that is above the touch-sensitive portion 144 (as shown in FIG. 8). Similarly, the speaker 138 may emit a sound such as a click.

Once the processor determines that one or more regions 141-46 have been touched, it determines how many regions are being simultaneously selected. In that regard, it may start a timer whereby all portions that are selected at any point during an elapsed period, or are selected at moment the expiration of the period, are considered to have been simultaneously selected.

When the processor determines the portions that have been simultaneously selected, it determines the character that corresponds with those portions. For example, memory 22 may store a lookup table where the lookup values represent various combinations and are associated with text characters.

When the appropriate text character is found, it may be displayed on the electronic display. For example, the letter "E" may be shown at the center 810 of the screen.

Figure 9:
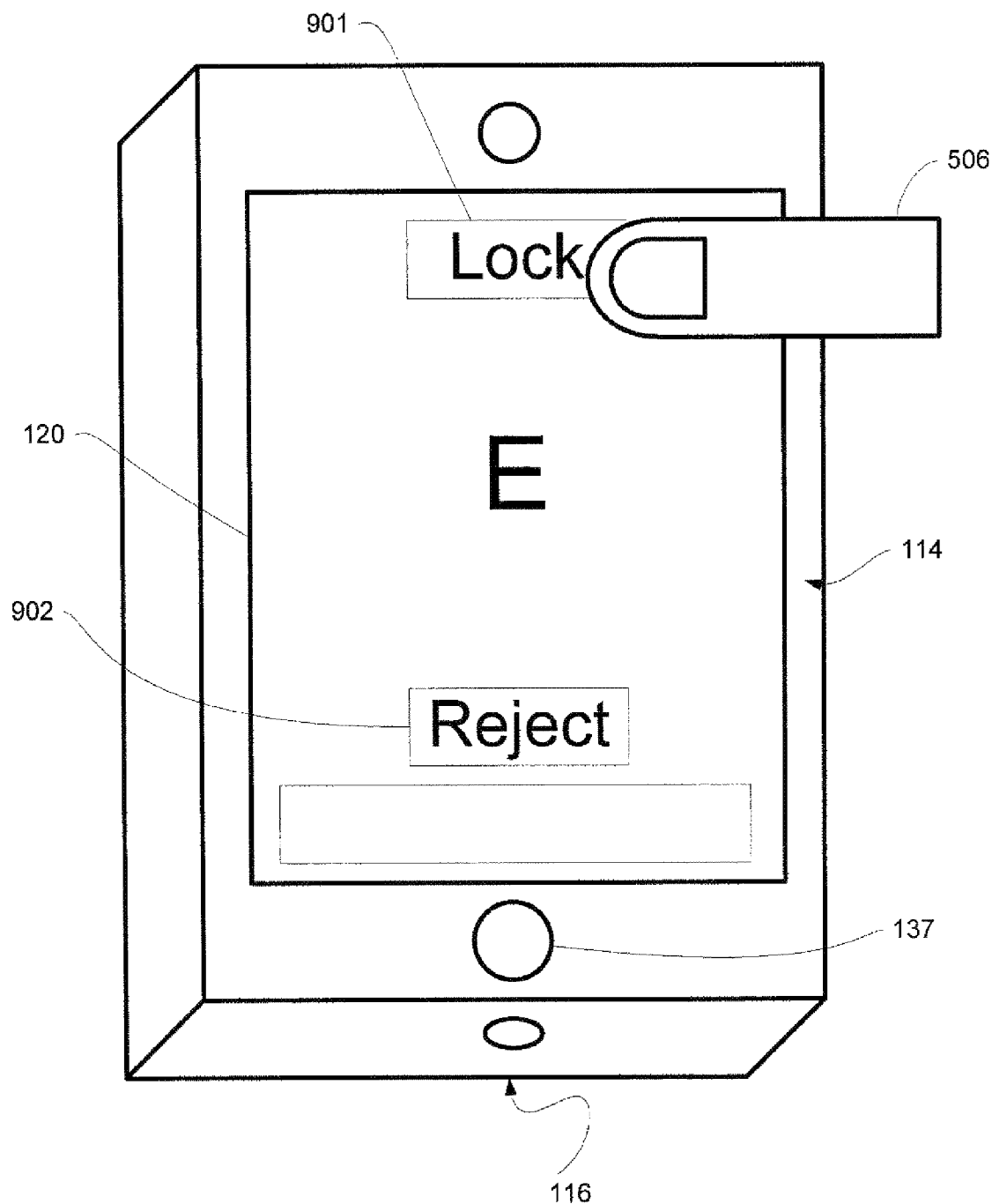
FIG. 9 is perspective view of a front surface of the device during another stage of user operation in accordance with an aspect of the invention.

In one aspect, the user will be asked to confirm that they intended to select the letter. For example, as shown in FIG. 9, the screen 130 may display a "Lock" button 901, whereby the user confirms the letter "E" by pressing the portion of the screen associated with the button, such as by using their thumb 506. Alternatively, the user may reject the letter by selecting a displayed "Reject" button 902 or by waiting for a period without locking the letter.

Figure 10:
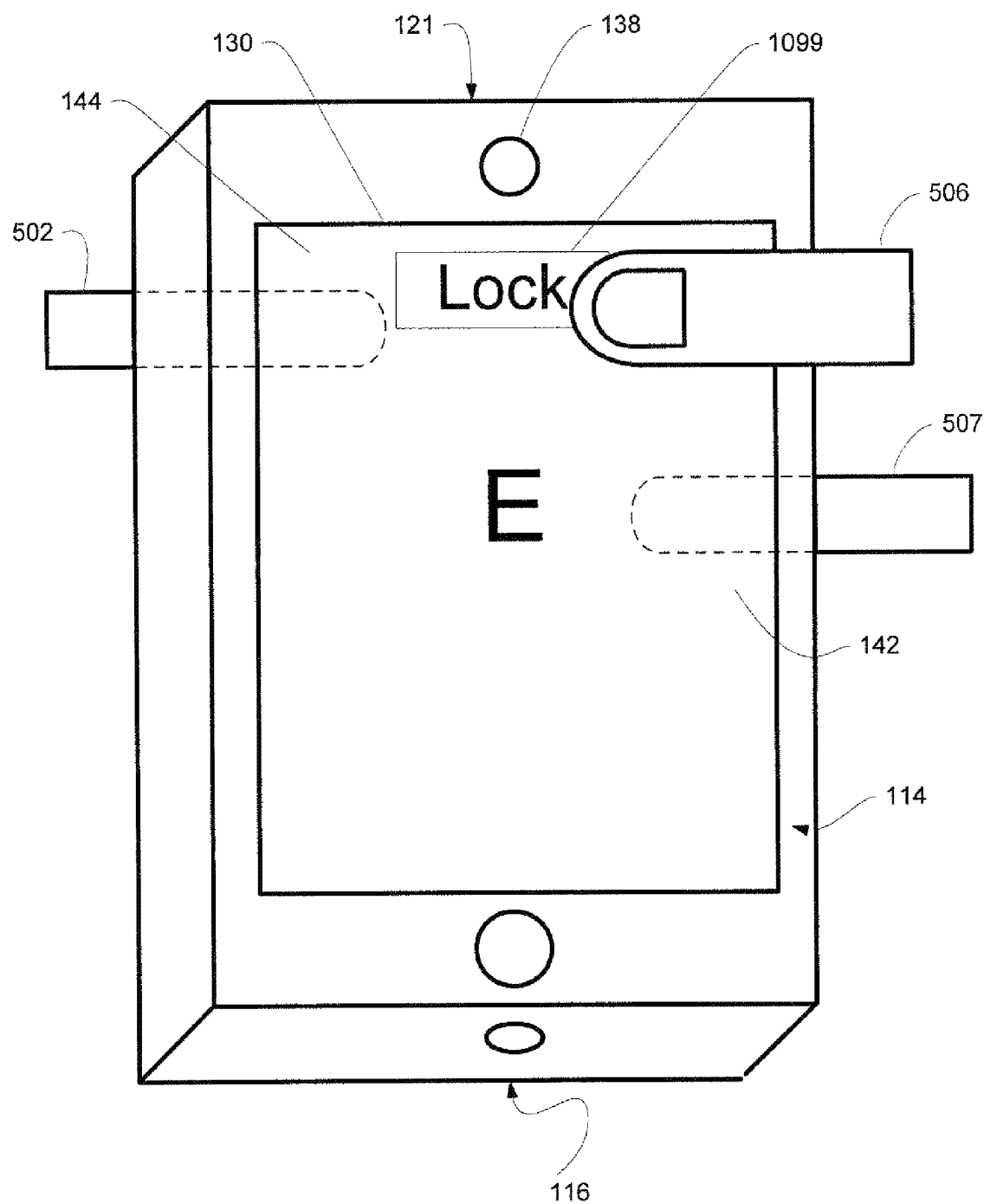
FIG. 10 is perspective view of a front surface of the device during another stage of user operation in accordance with an aspect of the invention.

Alternatively, as shown in FIG. 10, the device may permit or require the user to confirm the selection while simultaneously selecting the character. For example, the user may be effectively required to select the lock button 1099 with his thumb while simultaneously selecting regions on the back surface with fingers 502 and 507.

Figure 11:
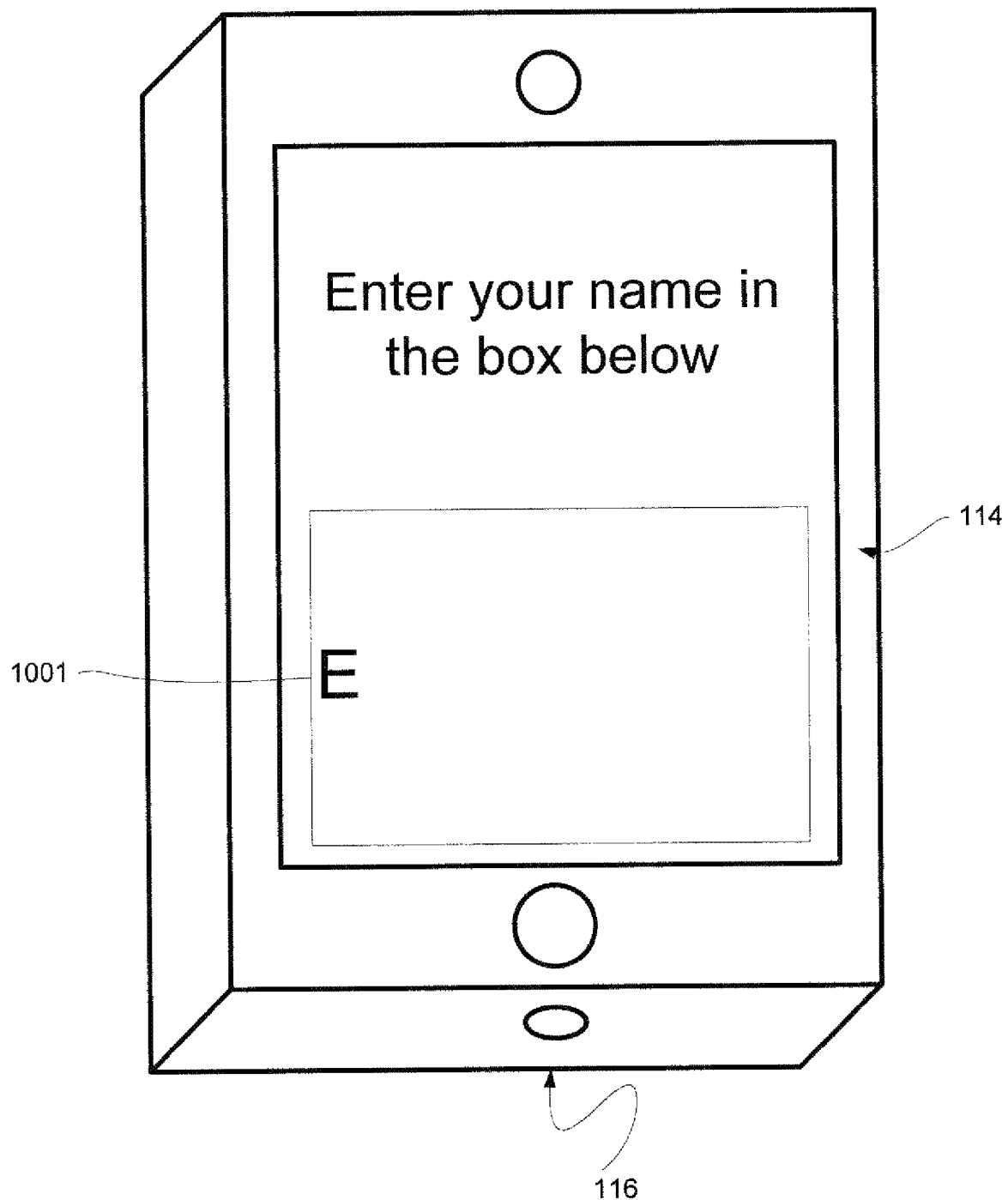
FIG. 11 is perspective view of a front surface of the device during another stage of user operation in accordance with an aspect of the invention.

Once the character has been confirmed, it may be processed accordingly. For example, as shown in FIG. 11, the user may have been entering his name in a textbox 1001, in which case the character will be displayed (or otherwise acted upon) as appropriate.

Figure 12:
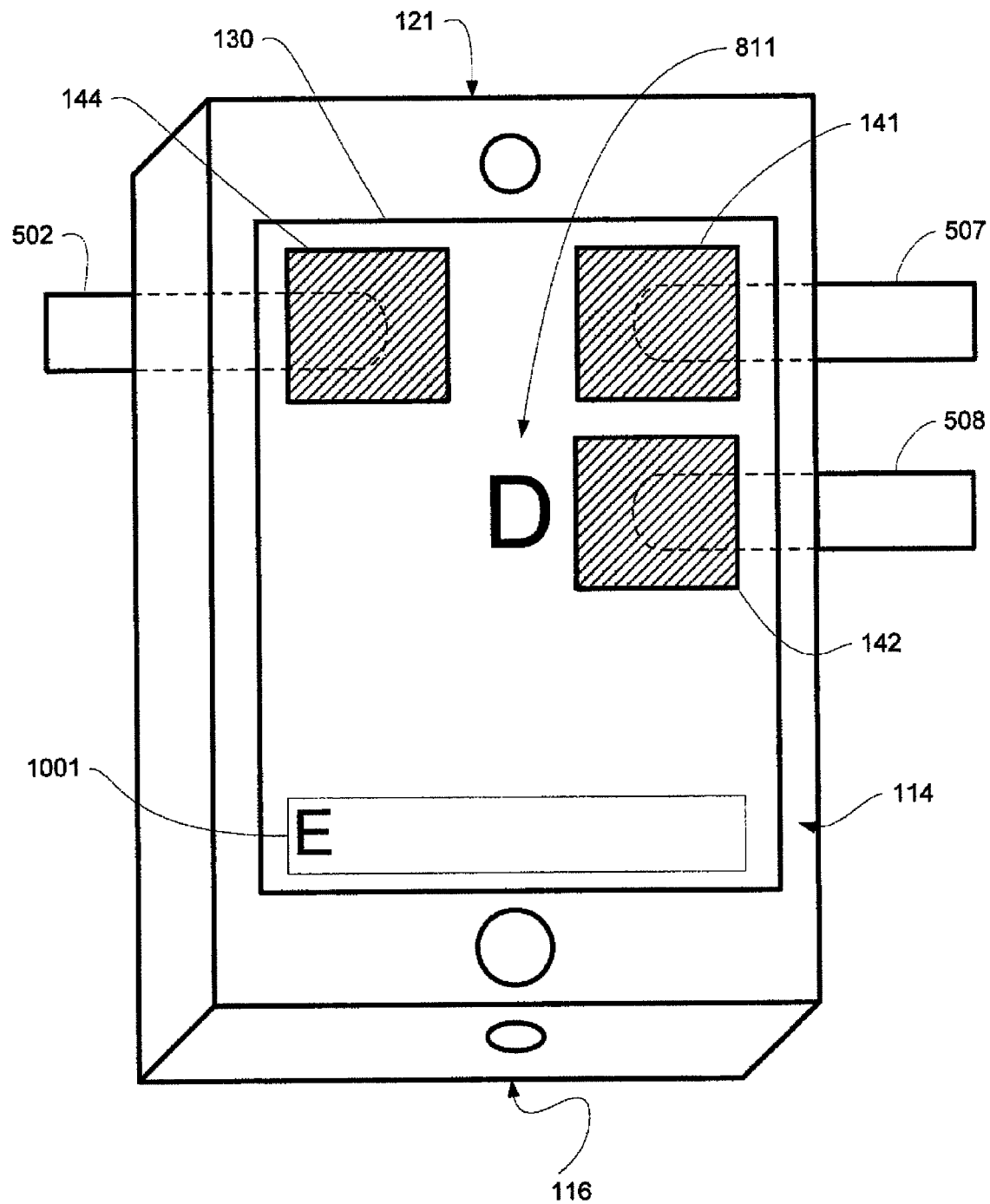
FIG. 12 is perspective view of a front surface of the device during another stage of user operation in accordance with an aspect of the invention.
Figure 13A:
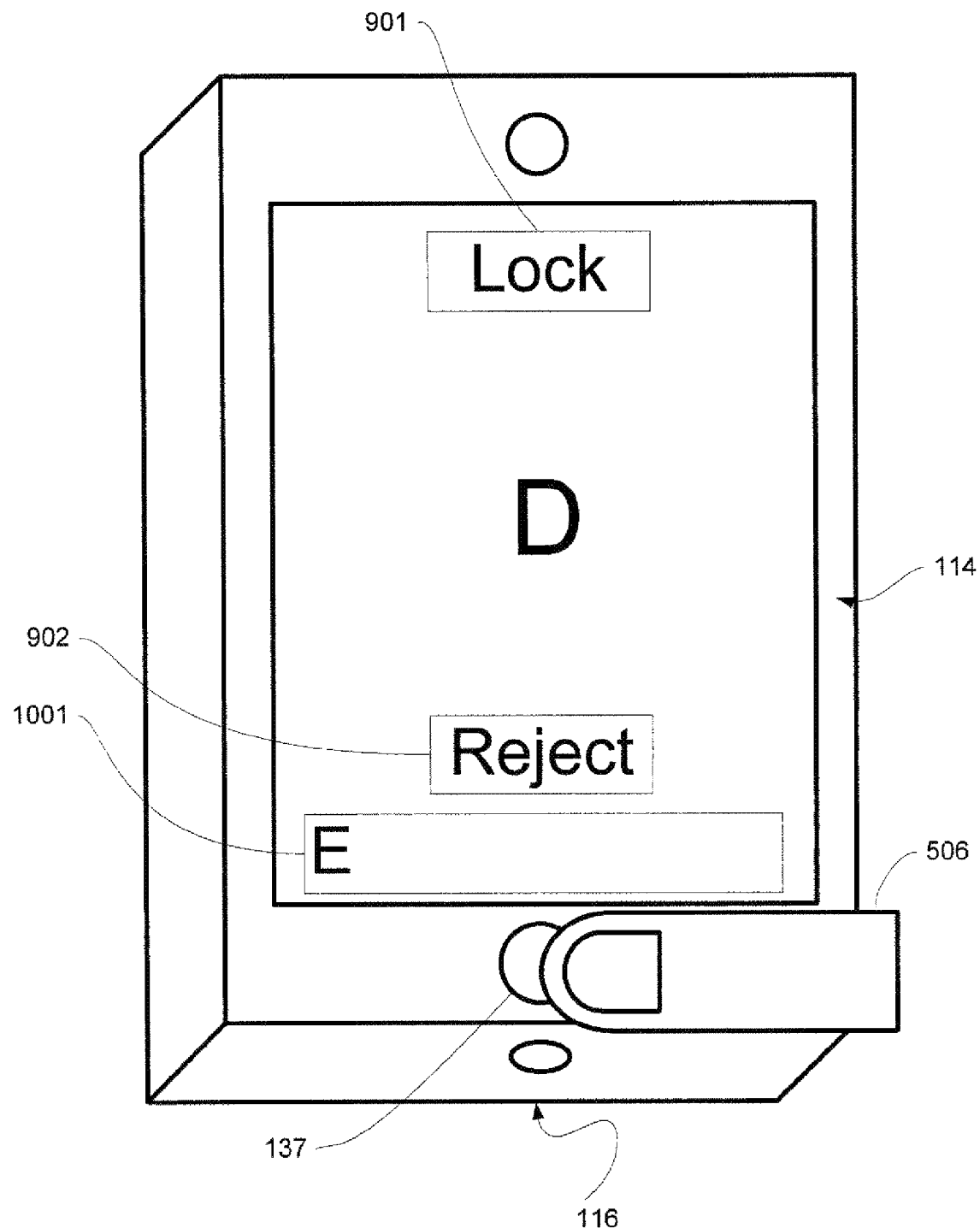
FIG. 13(A) is perspective view of a front surface of the device during another stage of user operation in accordance with an aspect of the invention.
Figure 13B:
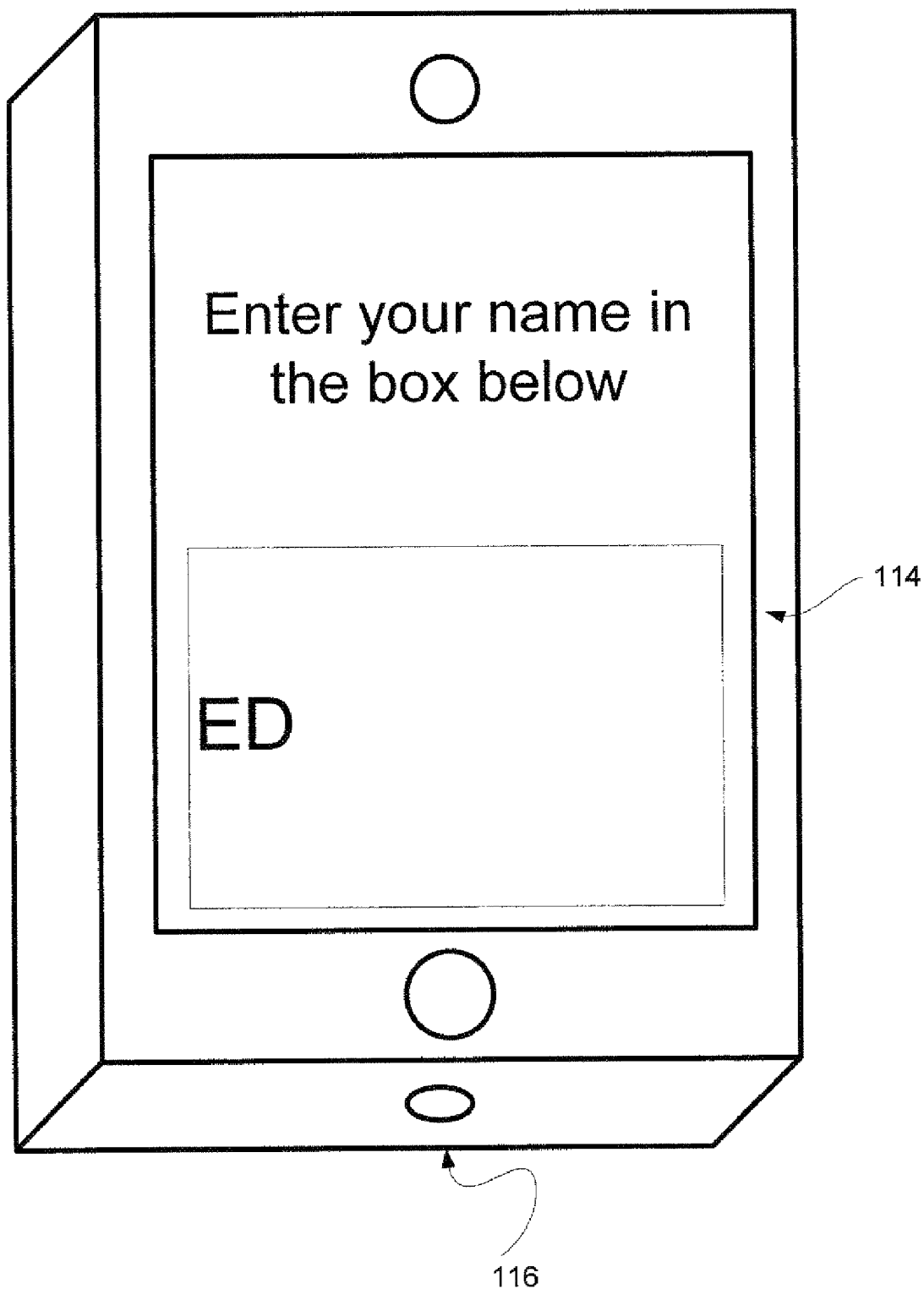
FIG. 13(B) is perspective view of a front surface of the device during another stage of user operation in accordance with an aspect of the invention.

The process may be repeated to enter subsequent characters. For example, as shown in FIG. 12, the user may simultaneously select portions 141, 142 and 144 to select the letter "D", which is displayed at the center 811 of the screen. As shown in FIG. 13(*a*), user may confirm or reject the letter by pressing button 901 or 902, respectively. FIG. 13(*a*) also shows an alternative embodiment whereby the user may select a hardware button 137 to accept the choice. The result in shown in FIG. 13(*b*).

The system and method is particularly advantageous with respect to its flexibility to accommodate various alternatives.

Figure 14:
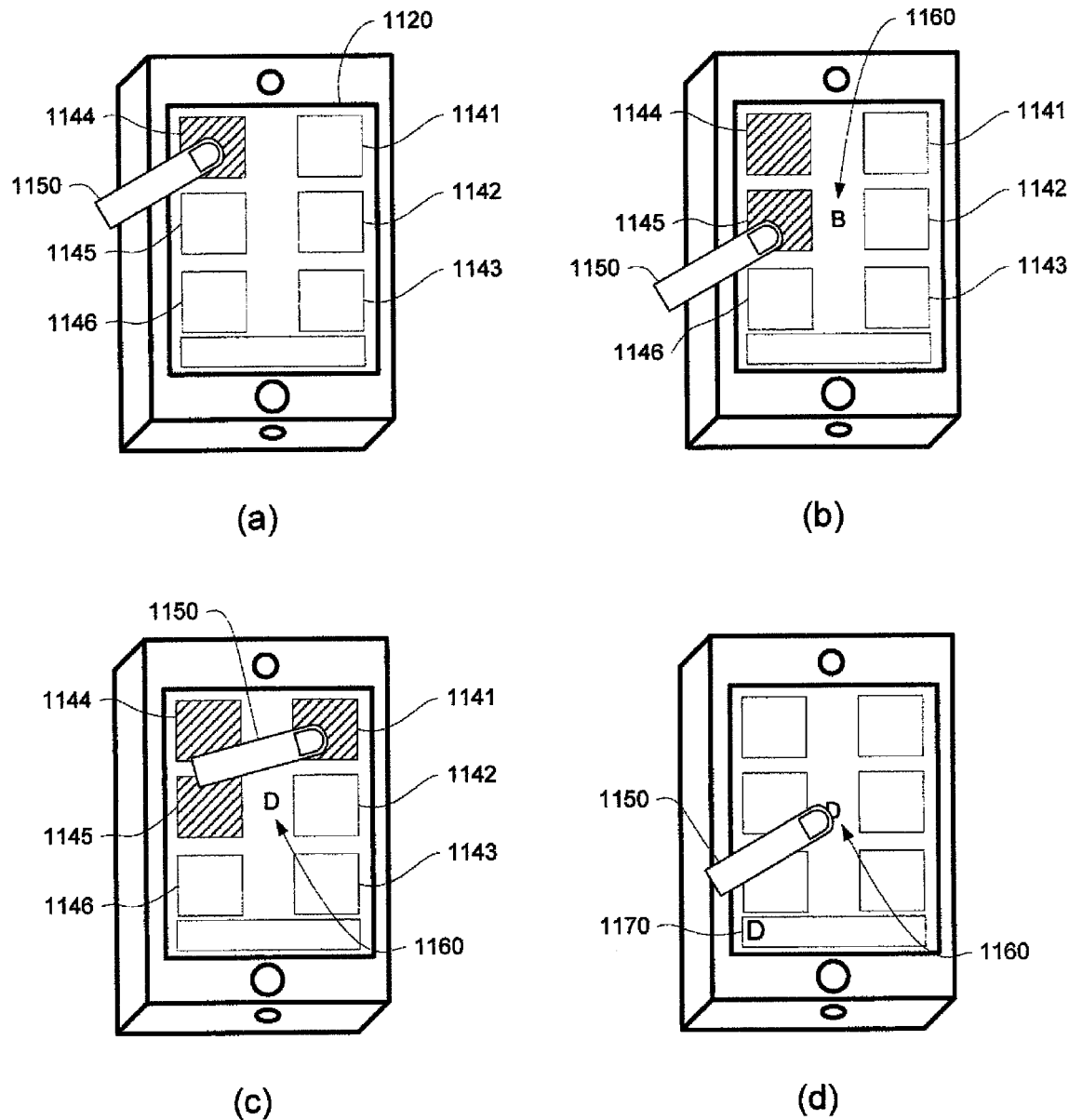
FIG. 14 is perspective view of a front surface of the device during various stages of user operation in accordance with an aspect of the invention.

FIG. 14 provides an alternative aspect wherein different characters are selected based on simultaneous selection of the regions, even though the regions are not necessarily simultaneously activated. The processor may associate, and display, a touch-sensitive screen 1120 with different portions 1141-46. As shown in FIG. 14(*a*), the user may select (or deselect if selected) each region by touching it, such as by touching region 1144 with left index finger 1150. The processor may then show the selection by highlighting the portion. As shown in FIG. 14(*b*), the user may select another region 1145 by touching it after the user touched region 1144. A text character matching these now simultaneously-selected regions 1145 may be displayed at the center 1160 of the screen. If another region is selected, such as region 1141 shown in FIG. 14(*c*), the text character matching the currently simultaneously-selected regions 1141-46 may be displayed. To confirm the selection, the user may confirm the displayed letter by touching the center 1160 of the screen, in which case it is processed in accordance as may be required, such as displaying in a textbox 1170. Although FIG. 14 illustrates an aspect whereby the character-confirmation area 1160 is different than the character selection areas 1141-46, such areas may overlap—especially if the character-confirmation area is displayed after the character has been selected.

In another aspect, the selection of regions may be used to perform actions on text. For example, certain combinations may be interpreted as a backspace, an instruction to move a text cursor such as forwards, or to shift from upper to lower case.

Figure 15:
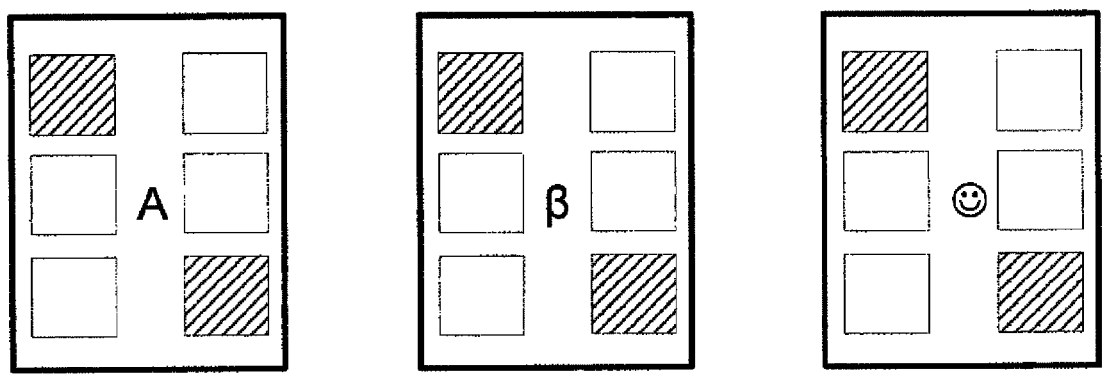
FIG. 15 illustrates screen shots of a device in accordance with an aspect of the invention.

In still another aspect, the combinations may be mapped to different sets of characters. For example, as shown in FIG. 15, the same combinations of simultaneously-selected regions may result in different characters depending on the character set. In some aspects, the user may select the character set by selecting certain combinations of regions.

In a further aspect, a variety of feedback may be provided to the user to confirm the selection of a character. For example, the processor 200 may energize a vibrational element 38 contained within the housing 112, thereby causing the device 100 to vibrate in the hands of the user. In still another aspect, also following determination of the text character, the processor 200 may generate audio signals and transmit same to the speaker 138 such as the name of the determined text character. In a further embodiment, the processor 200 may generate a control signal causing the LED 134 to illuminate, following the determination of the text character.

Figure 16:
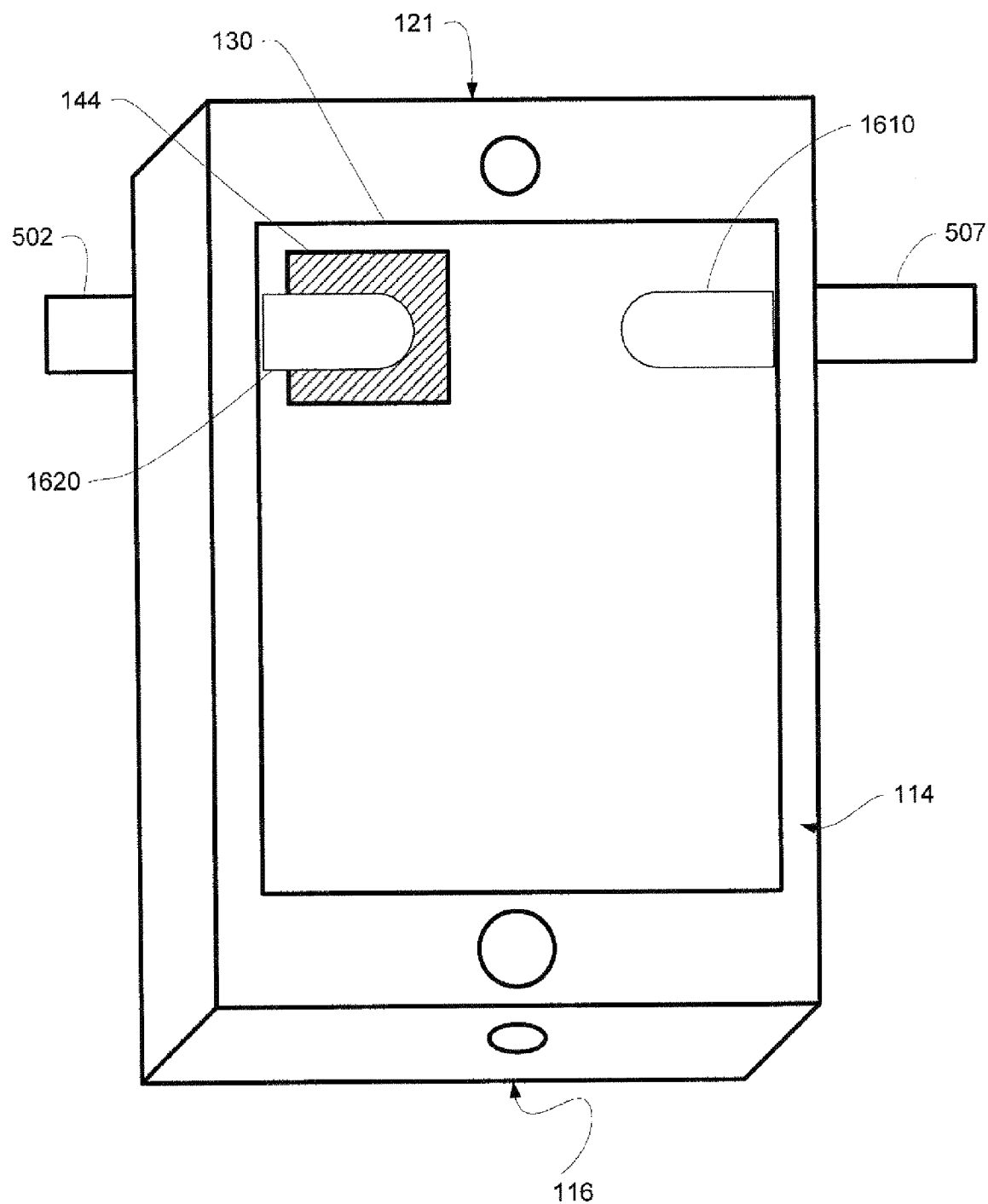
FIG. 16 is perspective view of a front surface of the device during a stage of user operation in accordance with an aspect of the invention.

In an another aspect of the invention and as shown in FIG. 16, the device includes a component for detecting the proximity of the fingers at the bottom surface the device and displays, on the screen, representations 1610 and 1620 of the user's fingers. For example, the back surface may include a number of infrared transmitters and detectors. The device may further include a camera on the back surface, in which case streaming video of the fingers below the device may also be shown.

In one aspect, the selection of a character may also be confirmed or locked by selecting a dedicated hardware button the bottom of the device, or by selecting a specific combination of regions.

Moreover, the location of the regions can be changed to the sides or other locations or configurations. For example, buttons may be disposed in six slots on the sides of the device for easier gripping.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for inputting text comprising:
    detecting user contact simultaneously with at least two of a plurality of discrete of touch sensitive areas, wherein input of a text character requires simultaneous contact by a user with at least two of the touch sensitive areas;
    determining a text character based on the detected simultaneous user contact with at least two touch sensitive areas; and
    confirming user selection of the text character based on additional user contact with a touch-sensitive area.

2. The method of claim 1, wherein confirming user selection of the text character comprises at least one of the user contacting another touch sensitive area or depressing a button.

3. The method of claim 1 further comprising providing feedback following at least one of the determination of the text character or confirming the user selection.

4. The method of claim 3, wherein the feedback comprises at least one of an audible, a visible or a vibrational output.

5. The method of claim 3, wherein the feedback comprises display of the determined text character on a display.

6. The method of claim 1, wherein the touch sensitive areas are external to the display.

7. The method of claim 1, wherein the text character is displayed on a first portion of the display before the confirmation.

8. The method of claim 7, wherein the text character is displayed on a second portion of the display after the confirmation, the second portion being different than the first portion.

9. The method of claim 1 further comprising displaying indicia representative of the detected areas as they are being contacted by the user.

10. A system comprising:
    a housing having a first surface and a second surface, the first and second surfaces being opposed to each other;
    at least two touch-sensitive regions on the second surface;
    a screen on the first surface;
    a processor;
    a memory storing instructions executable by the processor;
    the instructions comprising:
        identifying the regions that have been simultaneously touched by a user,
        determining a text character associated with the combination of the regions simultaneously touched by the user, and
        displaying the text character on the screen.

11. The system of claim 10 wherein each touch-sensitive regions is a button spaced apart from the other regions.

12. The system of claim 10 wherein each touch-sensitive regions comprises a different portion of the same touch-sensitive component.

13. The system of claim 12 wherein the touch-sensitive component is a touchpad.

14. The system of claim 10 wherein the memory stores a set of text characters and associates each different character of the set with a different combination of selected regions.

15. The system of claim 10 wherein the instructions further comprise detecting the proximity of a user's fingers near the touch-sensitive regions, and displaying on the display an indication of such proximity.

16. The system of claim 10 wherein the instructions further comprise displaying, on the display, an indication of the regions being touched by the user.

17. The system of claim 16 wherein the indication comprises displaying an indication on a portion of the screen that corresponds with a touched region.

18. The system of claim 17 wherein the portion of the screen is opposed to the touched region.

19. A system comprising:
   a first, second, third and fourth user-selectable region, each region being separately selectable from the others;
   a screen;
   a processor;
   a memory storing instructions executable by the processor; the instructions comprising:
      identifying the first, second and third regions that have been simultaneously selected by the user,
      determining a text character based on the combination of the identified regions,
      displaying the determined text character on the screen in a first area of the screen,
      determining whether the user has selected the fourth user-selectable region, and
      displaying the determined text character on the screen in a second area of the screen, different from the first area, based on the user selecting the fourth-selectable region.

20. The method of claim 19 wherein the first, second and third regions are different regions of the same touchpad.

21. The method of claim 19 wherein the display is a single touch screen and the first, second and third regions are different regions of the touch screen.

22. The method of claim 19 wherein the display is a single touch screen and the first, second, third and fourth regions are different regions of the touch screen.

23. The method of claim 19 wherein the display is a single touch screen and the first, second, third are different regions of the touch screen, wherein the fourth region is also a region of the display screen, and wherein the fourth region is indicated after the text character is determined.

24. The method of claim 19 wherein the text character is determined based on the correspondence between the identified first, second and third regions with a Braille alphabet.

* * * * *